(12) United States Patent
Kim et al.

(10) Patent No.: US 8,871,313 B2
(45) Date of Patent: Oct. 28, 2014

(54) OPTICAL SHEET

(75) Inventors: Kyoung Hwa Kim, Yongin-si (KR); Dae Shik Kim, Yongin-si (KR); Kyoung Jong Kim, Suwon-si (KR)

(73) Assignee: Kolon Industries, Inc., Gwacheon-si (KR)

( * ) Notice: Subject to any disclaimer, the term of this patent is extended or adjusted under 35 U.S.C. 154(b) by 609 days.

(21) Appl. No.: 12/921,079

(22) PCT Filed: Mar. 6, 2009

(86) PCT No.: PCT/KR2009/001124
§ 371 (c)(1),
(2), (4) Date: Sep. 3, 2010

(87) PCT Pub. No.: WO2009/110765
PCT Pub. Date: Sep. 11, 2009

(65) Prior Publication Data
US 2011/0008551 A1   Jan. 13, 2011

(30) Foreign Application Priority Data

Mar. 7, 2008  (KR) .................. 10-2008-0021319
Mar. 7, 2008  (KR) .................. 10-2008-0021325

(51) Int. Cl.
| C09K 19/00 | (2006.01) |
| B32B 3/00 | (2006.01) |
| G02B 5/04 | (2006.01) |
| G02B 1/04 | (2006.01) |
| F21V 5/02 | (2006.01) |

(52) U.S. Cl.
CPC ....... *G02B 1/04* (2013.01); *G02B 5/045* (2013.01); *F21V 5/02* (2013.01)
USPC ............. 428/1.3; 428/172; 428/156; 528/10; 526/245

(58) Field of Classification Search
None
See application file for complete search history.

(56) References Cited

U.S. PATENT DOCUMENTS

| 6,458,467 | B1 | 10/2002 | Mizuno et al. | |
| 6,596,375 | B2 * | 7/2003 | Murata et al. | 428/144 |
| 7,201,949 | B2 * | 4/2007 | Houghtaling et al. | 428/1.1 |
| 7,911,722 | B2 * | 3/2011 | Jung et al. | 359/834 |
| 2003/0095332 | A1 | 5/2003 | Gardner et al. | |
| 2007/0158623 | A1 | 7/2007 | Sawaguchi et al. | |

FOREIGN PATENT DOCUMENTS

| KR | 10-2002-0055584 A | 7/2002 | |
| KR | 10-2004-0085111 A | 10/2004 | |
| KR | WO2006080813 | * 8/2006 | ............... C07F 1/00 |
| KR | 10-2007-0004605 A | 1/2007 | |

* cited by examiner

*Primary Examiner* — Ellen S Raudenbush
*Assistant Examiner* — Anthony J Frost
(74) *Attorney, Agent, or Firm* — Sughrue Mion, PLLC

(57) ABSTRACT

The present invention relates to an optical sheet for use in a liquid crystal display. The optical sheet of the present invention allows for ease of handling, reduces defective proportions and manufacturing costs, improves throughput, and prevents the deterioration of luminance attributable to the damage of the optical sheet.

9 Claims, 5 Drawing Sheets

OBSERVED WHETHER SPOTS
OCCURRED BETWEEN CLOSELY

OPTICAL SHEET

CROSS REFERENCE TO RELATED APPLICATION

This application is a National Stage of International Application No. PCT/KR2009/001124 filed Mar. 6, 2009, claiming priority based on Korean Patent Application Nos. 10-2008-0021319 and 10-2008-0021325, filed Mar. 7, 2008, respectively, the contents of all of which are incorporated herein by reference in their entirety.

TECHNICAL FIELD

The present invention relates to an optical sheet used for a liquid crystal display (hereinafter, referred to as "LCD").

BACKGROUND ART

LCDs, which are used as optical display devices, are operated in an indirect manner so that an image is displayed by controlling the transmissivity of an external light source, and a backlight unit is used as an external light source and is an important part determining the characteristics of LCDs.

In particular, with the advance of LCD panel manufacturing technologies, high-brightness thin LCDs are increasingly required, and thus various attempts to increase the brightness of a backlight unit have been made. The barometer of excellence of LCDs, which are used for monitors, personal digital assistants (PDAs), notebooks and the like, is to exhibit high luminance using a small amount of energy. Therefore, the front brightness of LCDs is very important.

Since LCDs have a structure in which light having passed through a light diffusion layer is diffused in all directions, the amount of light radiating in the front direction of the LCD is very insufficient, and thus attempts to exhibit high brightness using low power consumption are being made continuously. Further, for large-area displays, attempts to enlarge a view angle allowing many users to easily view them have also been made.

However, when the power of a backlight unit is increased in order to enlarge the view angle, power consumption is increased, and thus power loss is also increased by heat. Therefore, in the case of portable displays, battery capacity is increased, and battery life is decreased.

Accordingly, in order to increase brightness, methods of providing orientation to light have been proposed, and, for this purpose, a variety of lens sheets have been developed. As a typical example of the lens sheets, there is a prism sheet having a prism structure, that is, a structure in which several ridges and recesses are linearly and regularly arrayed.

Here, the prism structure is a triangular array structure having an incline for improving brightness in a front direction. However, the prism sheet is problematic in that since the prism structure is provided with several ridges, the ridges are easily broken or abraded by weak external scratching, thus damaging the prism structure. Since the angles output from prism structure having the same shape are identical with respect to each array, brightness is reduced and defects are formed due to the differences in the light path between a damaged portion and a normal portion even when the corners of a triangle are somewhat crushed and the inclines of the triangle are slightly scratched. Therefore, the front face of the produced prism sheet may not be used depending on positions where even slight defects are formed at the time of producing the prism sheet. Thus, productivity is decreased, and production costs are increased. Really, even in enterprises assembling backlight modules, there is a problem in that, at the time of treating the prism sheet, the prism structure is damaged by scratching, thus causing defects.

Further, when a backlight unit is mounted with a prism sheet, the work of laminating several sheets and films is conducted. In order to increase brightness, a plurality of prism films may be mounted, and, in this case, there is a problem in that the upper portion of a lower prism film comes into contact with the lower portion of an upper prism film, thus easily damaging a prism structure.

Moreover, in consideration of brightness improvement, concealing ability and view angles, optical sheets having a structural form are practically used. When these optical sheets are mounted in a backlight unit, the work of laminating these optical sheets with other sheets and films is conducted, and, in this case, there is a problem in that the upper portion of a lower prism film comes into contact with the lower portion of an upper prism film, thus easily damaging a prism structure. Further, it is required to be cautious at the time of transporting or treating these optical sheets.

Therefore, in order to prevent such a structure from being damaged, conventionally, a protective film is additionally provided. However, as LCD panels become thin, the protective film is not used, and composite sheets are increasingly used. Further, since the process of laminating the protective film is additionally required, there are problems in that production costs are increased, and efficiency per time and physical efficiency are decreased.

In spite of the damage of the prism structure, portable displays, such as notebooks, personal digital assistants (PDAs) and the like, are increasingly used, and simultaneously most users move around with the portable displays in their bags and the like. In this case, when this portable display is shocked by the running during movement, sudden stops of vehicles or the like, a prism structure mounted in the portable display is damaged even though the portable display has a protective film, thus badly influencing a screen.

Meanwhile, in order to solve the above problems, an optical sheet was manufactured using a material having excellent elasticity. However, this optical sheet is also problematic in that sheets closely adhere to each other due to the sticky properties of a resin, thus forming defects or spots.

DISCLOSURE

Technical Problem

The present invention intends to provide an optical sheet which can be easily treated by providing slippability to the optical sheet to prevent it from being damaged.

Further, the present invention intends to provide an optical sheet which can be easily treated by preventing a structure from being damaged.

Further, the present invention intends to provide an optical sheet which can reduce defective fractions and production costs and can increase production efficiency because the optical sheet has excellent workability and reliability.

Further, the present invention intends to provide an optical sheet which does not need a protective film.

Further, the present invention intends to provide an elastic optical sheet which can prevent a structure layer from being damaged such that it is not influenced by external shock when it is applied to displays.

Further, the present invention intends to provide an optical sheet which can prevent a structure from being damaged and which can reduce defective fractions because it is not sticky to improve workability and reliability.

Further, the present invention intends to provide an elastic optical sheet which can maintain the function of a prism structure by preventing the deterioration of brightness attributable to the difference in the light path.

Further, the present invention intends to provide an elastic optical sheet which does not need a protective film.

Further, the present invention intends to provide an elastic optical sheet which can reduce defective fractions and production costs and can increase production efficiency.

Technical Solution

An aspect of the present invention provides an optical sheet comprising a resin cured layer having a molecular chain containing a slippable element.

Another aspect of the present invention provides an optical sheet comprising a resin cured layer whose surface is structurized and which has a molecular chain containing a slippable element.

Here, the optical sheet may have an elastic recovery rate of 85% or more, which is represented by Mathematical Formula 1 below when the structurized surface of the resin cured layer is pressed to a maximum compression force of 1 $g_f$ at a pressing speed of 0.2031 mN/sec using a flat indenter, and then the pressing of the structurized surface thereof is stopped for 5 seconds with it compressed, and then released:

$$Elastic\ recovery\ rate = \frac{D1 - D2}{D1} \times 100 \quad \text{Mathematical Formula 1}$$

wherein $D_1$ is a depth of the optical sheet compressed by external pressure, and $D_2$ is a difference between the height of the optical sheet to which external pressure is not applied and the height of the optical sheet which is recovered by removing the external pressure.

Further, the optical sheet may comprise: a base layer; and a structure layer whose surface is structurized, wherein the structure layer may be a resin cured layer having a molecular chain containing a slippable element.

Further, the optical sheet may comprise: a base layer; a structure layer formed on the base layer and having a structurized surface; and a resin cured layer formed on the structure layer and having a molecular chain containing a slippable element. In this case, the optical sheet may further comprise a resin cured layer having a molecular chain containing a slippable element on the other side of the base layer, wherein the other side thereof is not provided with the structure layer. Further, in this case, the structure layer may be a resin cured layer having a molecular chain containing a slippable element.

Further, the slippable element may be F or Si.

Further, the resin cured layer may be formed of a curable resin including F or Si. In this case, the curable resin may include one or more selected from organic silicon compounds and fluorine-based acrylates.

Further, the structure layer may have a polygonal, semicircular or semielliptical polyhedron shape whose longitudinal section is polygonal and whose peak is streamline, may have a polygonal, semicircular or semielliptical cylinder shape whose longitudinal section is polygonal and whose peak is streamline, and may have a polygonal, semicircular or semielliptical curved cylinder shape whose longitudinal section is polygonal and whose peak is streamline.

Further, the optical sheet may have an elastic recovery rate of 90% or more.

Further, the optical sheet may satisfy Mathematical Formula 2, preferably Mathematical Formula 3, more preferably Mathematical Formula 4 below:

$$D1 > \frac{D}{25} \quad \text{Mathematical Formula 2}$$

$$D1 > \frac{D}{19} \quad \text{Mathematical Formula 3}$$

$$D1 > \frac{D}{14} \quad \text{Mathematical Formula 4}$$

wherein D is a height of the optical sheet to which external pressure is not applied.

Advantageous Effects

According to the present invention, the optical sheet is not damaged by external shock and can be easily treated because it has slippability, and can reduce defective fractions and production costs and can increase production efficiency because it has excellent workability and reliability, thereby not needing an additional protective film.

Further, the optical sheet can prevent its structure layer from being damaged such that it is not influenced by external shock when it is applied to displays. Therefore, even when the optical sheet is applied to portable displays such as notebooks, personal digital assistants (PDAs) an the like, the optical sheet is not easily damaged by external shocks such as running with the portable displays in a bag, sudden stops of vehicles or the like, and can prevent its structure layer from being damaged, and thus can be easily treated. Further, the optical sheet is not sticky, so that workability and reliability are improved, with the result that defective fractions can be reduced and the deterioration of brightness due to damages can be prevented. Therefore, the optical sheet can maintain its original function and does not require a protective film, so that its manufacturing process is simple, its manufacturing costs can be reduced, its manufacturing efficiency can be increased, and it cannot be easily damaged by film laminating or external shocks during its manufacturing process, with the result that defective fractions can be reduced, thereby reducing manufacturing costs and increasing manufacturing efficiency.

DESCRIPTION OF THE ELEMENTS IN THE DRAWINGS

10: base layer
20: structure layer
30, 40: resin cured layer

[Best Mode]

Hereinafter, the present invention will be described in detail.

An embodiment of the present invention provides an optical sheet including a resin cured layer having a molecular chain containing a slippable element.

The optical sheet of the present invention may have a structurized surface. Specifically, the optical sheet includes a base layer and a structure layer formed on one side or both sides of the base layer. Here, the structure layer, which is a resin cured layer whose surface is structurized, may include a plurality of steric structures. Further, the optical sheet including the structure layer may be integrally extruded.

The optical sheet of the present invention may further include a resin cured layer formed on the structure layer and having a molecular chain containing a slippable element, or may include a curable resin including a composition for forming the base layer and a slippable element. Further, the optical sheet of the present invention may further include a resin cured layer formed on the base layer and having a molecular chain containing a slippable element.

As such, the optical sheet of the present invention can exhibit uniform and continuous slippability because a molecular chain contains a slippable element, compared to when a slippable inorganic substance is added to a composition for forming a structure layer or is applied on the surface of a structure layer.

Hereinafter, preferred embodiments of the present invention will be described in more detail with reference to the attached drawings.

Figure 1:
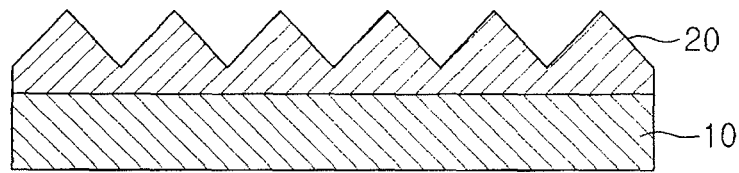
FIG. 1 is a sectional view showing an optical sheet according to an embodiment of the present invention.

FIG. 1 is a sectional view showing an optical sheet according to an embodiment of the present invention. As shown in FIG. 1, the optical sheet according to this embodiment includes: a base layer 10; and a structure layer 20 formed on one side of the base layer 10, wherein the structure layer is a resin cured layer having a molecular chain containing a slippable element.

Figure 2:
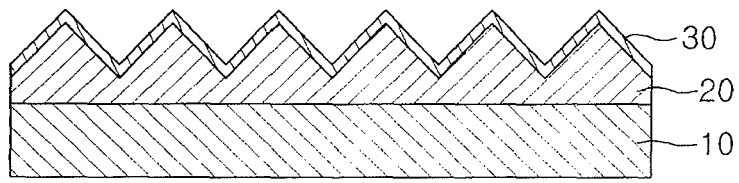
FIG. 2 is a sectional view showing an optical sheet according to an embodiment of the present invention.

FIG. 2 is a sectional view showing an optical sheet according to another embodiment of the present invention. As shown in FIG. 2, the optical sheet according to this embodiment includes: a base layer 10; a structure layer 20 formed on one side of the base layer 10; and a resin cured layer 30 formed on the structure layer 20 and having a molecular chain containing a slippable element.

Figure 3:
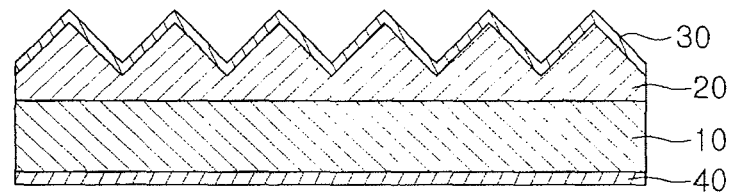
FIG. 3 is a sectional view showing an optical sheet according to still another embodiment of the present invention.

FIG. 3 is a sectional view showing an optical sheet according to still another embodiment of the present invention. As shown in FIG. 3, the optical sheet according to this embodiment includes a base layer 10; a structure layer 20 formed on one side of the base layer 10; a resin cured layer 30 formed on the structure layer 20 and having a molecular chain containing a slippable element; and a resin cured layer 30 formed on the other side of the base layer 10 and having a molecular chain containing a slippable element.

In the drawings, for convenience, the same reference numerals are used throughout the different drawings to designate the same or similar components.

In the case where the optical sheet of the present invention additionally includes the resin cured layer 30 having a molecular chain containing a slippable element (refer to FIGS. 2 and 3), the resin cured layer 30 may be formed by applying a composition including a curable resin and a photoinitiator onto the structure layer 20. In this case, the curable resin included in the resin cured layer 30 may be one or more selected from organic silicon compounds including silicon acrylates and siloxane resins, and fluorine-based acrylates, and the photoinitiator, for example BAPO or MAPO, may be used without limitation as long as they are commonly known. In this case, the resin cured layer 30 can be formed by applying the composition onto the structure layer 20. Meanwhile, when a structure layer is additionally coated with a composition for providing slippability, spray coating or the like may be used such that the composition is entirely and uniformly applied on the structure layer. Therefore, the resin cured layer 30 has a thickness of less than 1 μm, which is very thin, but can provide desired slippability to the optical sheet without problems. Accordingly, the resin cured layer 30 can be cured by a curable resin and may have a molecular chain containing a slippable element such as Si or F.

Meanwhile, the structure layer 20 may be formed by a conventional method, that is, by applying a composition including a curable binder resin and a photoinitiator onto the base layer 10, molding the composition to form a structure and then curing the structure.

In this case, the structure layer 20 may have a steric structure having a pitch of 25~500 μm and a height of 12~300 μm in order to minimize optical loss and efficiently collect light in consideration of light refraction.

The shape of the steric structure constituting the structure layer 20 may be symmetrical based on the vertical center line passing through a peak point, but is not limited thereto.

As shown in FIG. 3, the resin cured layers 30 and 40 may be formed on the other side of the base layer 10, on which the structure layer 20 is not formed, as well as on the structure layer 20, so as to provide slippability, thus preventing the base layer 20 from being damaged at the time of treating the optical sheet.

As described above, the optical sheet of the present invention may additionally include the resin cured layer 30 or 40, but may include a composition for forming a structure layer and a curable resin containing a slippable element.

In this case, a composition including a binder resin forming the structure layer 120, a curable resin providing slippability and a photoinitiator is applied onto the base layer 10 to form a structure layer 20 including a plurality of structures. The binder resin may be used without limitation as long as it is commonly known as a conventional resin for forming a prism, and examples thereof may include unsaturated aliphatic esters, aromatic vinyl compounds, unsaturated aliphatic acids and derivatives thereof, unsaturated dibasic acids and derivatives thereof, vinyl cyanide compounds, such as methacrylonitrile and the like. Among them, it is preferred that unsaturated aliphatic esters be used as the binder resin because the structure layer 20 must have excellent transparency and optical characteristics.

It is preferred that the curable resin containing a slippable element be included in an amount of 0.01~5.0 parts by weight based on 100 parts by weight of the binder resin in consideration of preventing the deterioration of brightness.

Accordingly, the binder resin and curable resin included in the structure layer 20 are cured, thus forming a structure layer 20 having a molecular chain containing a slippable element such as Si or F.

As described above, the optical sheet of the present invention can prevent the increase of a defective fraction attributable to the decrease of workability or reliability at the time of applying the optical sheet to a backlight unit because a slippable element is included inside or outside the structure layer 20 of the optical sheet.

The optical sheet of the present invention includes a structure layer 20 having a plurality of steric structures, wherein the structure layer is a resin cured layer whose surface is structurized. The structure layer 20 may have a polygonal, semicircular or semielliptical polyhedron shape whose longitudinal section is polygonal and whose peak is streamline, may have a polygonal, semicircular or semielliptical cylinder shape whose longitudinal section is polygonal and whose peak is streamline, or may have a polygonal, semicircular or semielliptical curved cylinder shape whose longitudinal section is polygonal and whose peak is streamline. Further, the structure layer 20 may have a shape in which one or more patterns thereof are combined.

Furthermore, the structure layer 20 may have a structure in which one or more concentric circles are arranged and ridges and recesses are formed along the concentric circles, as viewed in a plan view.

When the longitudinal section of the structure layer 20 is polygonal, the brightness and view angle of the optical sheet are severely changed depending on the angle of a peak portion. Therefore, considering the brightness and view angle thereof due to light collection, the angle of the peak portion may be 80~100°, preferably, 85~95°.

Further, when the longitudinal section of the structure layer 20 is polygonal, a peak portion is rounded to form a streamline portion, and, in this case, from the longitudinal section of the structure layer 20, the longest width of the streamline portion may be 0.5~10 μm.

Meanwhile, when the structure layer 20 has a structure whose longitudinal section is polygonal among the plurality of steric structures, the upper portion of the optical sheet is pointed in the form of a ridge, and thus the optical sheet can be easily damaged by external shock. From this point of view, according to the optical sheet of an embodiment of the present invention, the top surface of the structure layer 20 is pressed to a maximum compression force of 1 or 2 $g_f$ at a pressing speed of 0.2031 mN/sec using a flat indenter, and then the pressing of the top surface thereof is stopped for 5 seconds with it compressed and then released. In this case, the elastic recovery rate represented by Mathematical Formula 1 below may be 85% or more, more preferably, 90% or more:

$$Elastic\,recovery\,rate = \frac{D1 - D2}{D1} \times 100 \qquad \text{Mathematical Formula 1}$$

wherein $D_1$ is a depth of the optical sheet compressed by external pressure, and $D_2$ is a difference between the height of the optical sheet to which external pressure is not applied and the height of the optical sheet which is recovered by removing the external pressure.

In the optical sheet according to an embodiment of the present invention, when the elastic recovery rate represented by Mathematical Formula 1 above is 85% or more, the optical sheet has elasticity to such a degree that it can flexibly cope with an externally-applied shock, thus preventing the structure layer from being damaged.

Conversely, when the elastic recovery rate represented by Mathematical Formula 1 above is less than 85%, the optical sheet is maintained with its structure layer pressed when it is brought into contact with other film or it is loaded with another film, and thus the optical sheet cannot fulfill its function.

In the elastic optical sheet according to an embodiment of the present invention, $D_1$, which is a depth of the optical sheet compressed by external pressure, may satisfy Mathematical Formula 2, preferably Mathematical Formula 3, more preferably Mathematical Formula 4 below:

$$D1 > \frac{D}{25} \qquad \text{Mathematical Formula 2}$$

$$D1 > \frac{D}{19} \qquad \text{Mathematical Formula 3}$$

$$D1 > \frac{D}{14} \qquad \text{Mathematical Formula 4}$$

wherein D is a height of the optical sheet to which external pressure is not applied.

That is, the elastic optical sheet according to an embodiment of the present invention needs to have flexibility such that the ratio of the depth of the base layer compressed by external pressure to the height of the optical sheet to which external pressure is not applied is 1/25 or more in order to normally maintain the shape of the upper portion of the structure layer thereof.

In conclusion, when the elastic optical sheet according to an embodiment of the present invention is strongly loaded, its structure layer having a steric structure is easily pressed. However, when the pressed elastic optical sheet is released, it returns to an original state to the utmost, and thus the structure layer is not damaged by external shock.

As described above, in order to provide the optical sheet satisfying the elastic recovery rate, various methods may be used. One of the methods may be a method of forming a structure layer using a material exhibiting elastomer propensity than rubber propensity and not inhibiting optical properties.

In this respect, urethane acrylate, styrene monomer, butadiene monomer, isoprene monomer, silicon acrylate or the like may be considered as a material for forming a structure layer. However, as long as the above elastic recovery rate is satisfied, a curable monomer or oligomer, which is a curable material included in a composition for forming a structure layer, may also be considered as the material for forming the structure layer.

Further, since the curable material has adhesivity, workability is decreased due to adhesion between sheets when the curable material is applied to a backlight unit, thus increasing the defective fraction. This problem can be solved by forming a resin cured layer having a molecular chain containing a slippable element, and, in this case, uniform and continuous slippability can be provided compared to when a slippable inorganic is added to the composition for forming a structure layer or is applied onto the surface of the structure layer.

The elastic optical sheet according to an embodiment of the present invention may further include a resin cured layer having a molecular chain containing a slippable element on the structure layer, or may include a structure layer including a curable resin having a molecular chain containing a slippable element such as Si or F.

Meanwhile, in the elastic optical sheet according to an embodiment of the present invention, the resin cured layer may be formed by mixing one or more selected from a curable monomer or oligomer, such as urethane acrylate, a styrene monomer, a butadiene monomer, an isoprene monomer or silicon acrylate, a binder resin, an organic silicon compound including a curable resin providing slippability such as silicon acrylate or a siloxane-based resin, and a fluorine-based resin. In this case, as described above, the amount of the curable resin containing a slippable element is not particularly limited, but may be 0.01~5.0 parts by weight based on 100 parts by weight of the binder resin. Accordingly, the binder resin and the curable resin included in the structure layer 20 are cured, thus forming a structure layer 20 having a molecular chain containing a slippable element such as Si or F.

As described above, the resin cured layer may be further formed even on the other side of the base layer, on which the structure layer is not formed, so as to provide slippability, thus preventing the base layer from being damaged at the time of treating the optical sheet.

Hereinafter, the elastic optical sheet according to an embodiment of the present invention will be described in detail with reference to the attached drawings.

Figure 4:
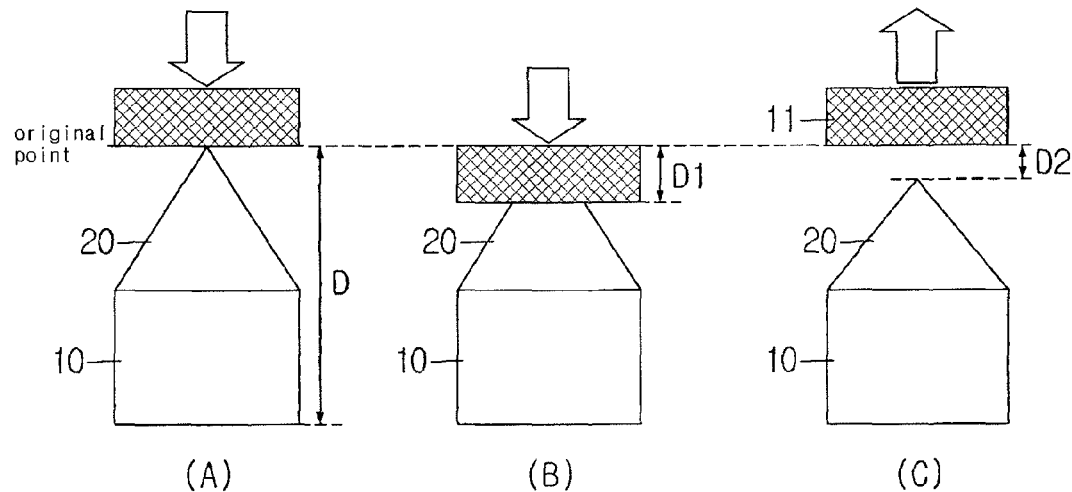
FIG. 4 is a view showing a test of the elastic recovery rate of an optical sheet.

FIG. 4 is a view showing a test of an elastic recovery rate of an optical sheet.

When a structure layer 20 of the optical sheet is forced by a flat indenter 11, as shown in FIG. 4B, the top surface of the structure layer 20 is compressed. In this case, the depth of the compressed structure layer is $D_1$. In the present invention, it is preferred that the ratio of the depth ($D_1$) of the structure layer 20 compressed by external pressure to the height (D) of the optical sheet to which external pressure is not applied is 1/25 or more, preferably 1/19 or more, more preferably 1/14. That is, the optical sheet of the present invention has flexibility such that the structure layer 20 can be deeply compressed by external shock without being damaged.

Thereafter, when the flat indenter 11 is removed, as shown in FIG. 4C, the top surface of the structure layer 120 returns to its original state. In this case, the difference between the height (D) of the optical sheet to which external pressure is not applied and the height of the optical sheet which is recovered by removing the flat indenter 11 is $D_2$.

Therefore, as the difference ($D_1-D_2$) between the depth ($D_1$) of the structure layer 20 compressed by external pressure and the difference between the height of the optical sheet to which external pressure is not applied and the height of the optical sheet which is recovered by removing the external pressure is increased, the elasticity of the optical sheet is increased. In the optical sheet of the present invention, since the elastic recovery rate represented by Mathematical Formula 1 above is 85% or more, preferably 90% or more, the elasticity of the optical sheet of the present invention is excellent, and thus the optical sheet returns to its original state as much as possible when it is deeply compressed by external shock.

Figure 5:
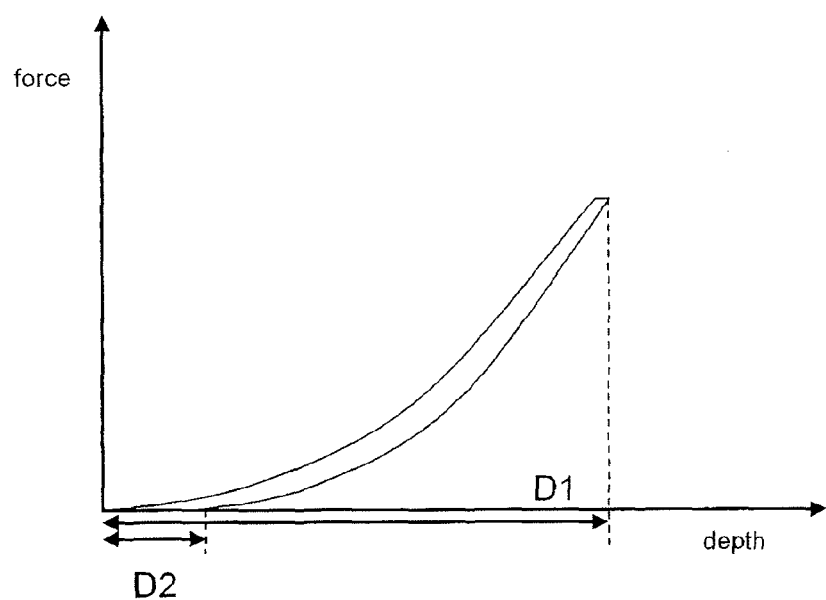
FIG. 5 is a graph showing the relationship between a force applied to a polymer material having a high elastic recovery rate and D1 and D2.
Figure 6:
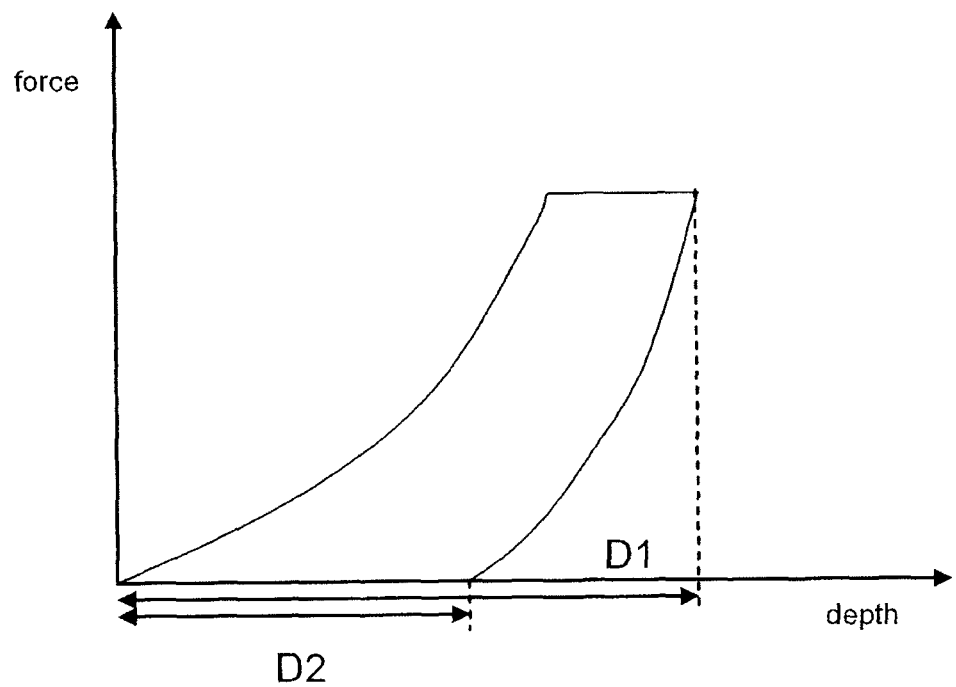
FIG. 6 is a graph showing the relationship between a force applied to a polymer material having a low elastic recovery rate and D1 and D2.

FIG. 5 is a graph showing the relationship between the force applied to a polymer material having a high elastic recovery rate and $D_1$ and $D_2$, and FIG. 6 is a graph showing the relationship between the force applied to a polymer material having a low elastic recovery rate and $D_1$ and $D_2$. Here, in the case of a material having a high elastic recovery rate, $D_2$ approximates to 0, and, in the case of a material having ideal elasticity, $D_2$ becomes 0, and thus its elastic recovery rate becomes 100%. Conversely, in the case of a material having a low elastic recovery rate, $D_2$ approximates to $D_1$, and thus $D_1-D_2$ approximates to 0.

The optical sheet of the present invention approximately corresponds to FIG. 5, and the polymer material of the present invention is not limited to the curved form of FIG. 5.

Figure 7:
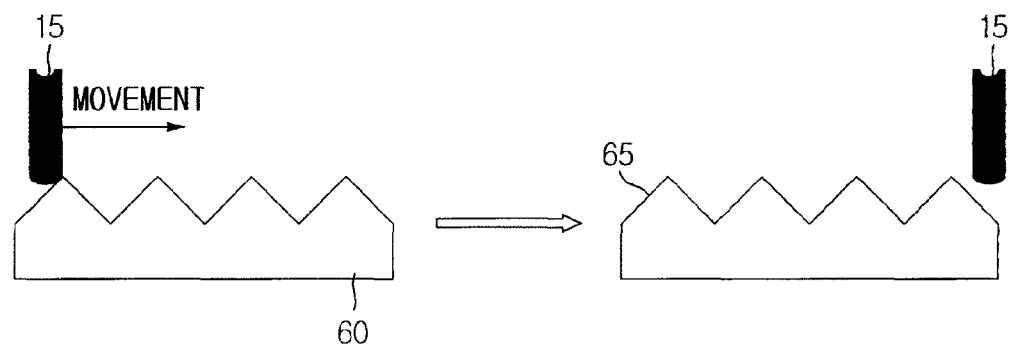
FIG. 7 is a view showing a procedure of scratching the optical sheet of the present invention using a scratching probe.
Figure 8:
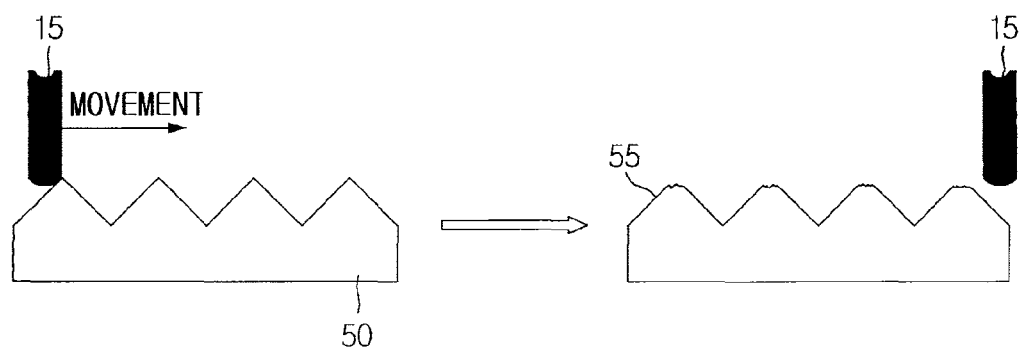
FIG. 8 is a view showing a procedure of scratching a conventional optical sheet using a scratching probe.
Figure 9:
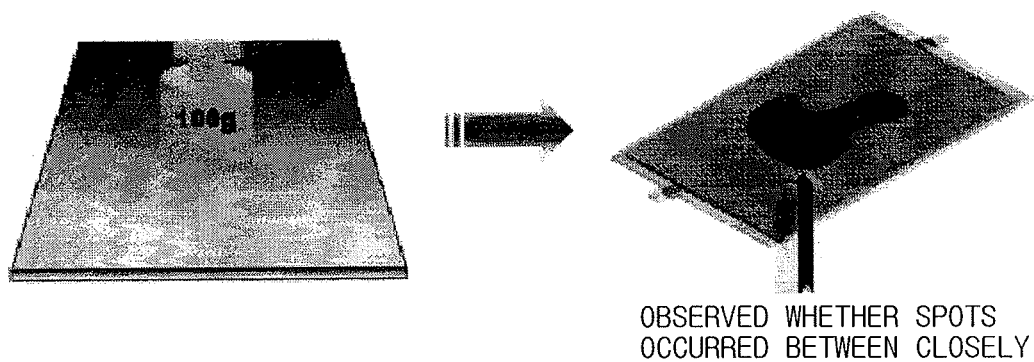
FIG. 9 is a view showing whether or not optical sheets adhere closely to each other after an adhesion test between the optical sheets.

FIG. 7 is a view showing a procedure of scratching the elastic optical sheet 60 of the present invention using a scratching probe 15, and FIG. 8 is a view showing a procedure of scratching a conventional optical sheet 50 using a scratching probe 15.

It can be seen from FIG. 8 that the upper portion of the structure layer 55 of the conventional optical sheet 50 is severely deformed or broken by the scratching probe 15, and thus the conventional optical sheet 50 was severely damaged. In contrast, it can be seen from FIG. 7 that the upper portion of the structure layer 65 of the elastic optical sheet 60 of the present invention was not damaged.

In the above-mentioned optical sheets according to preferred embodiments of the present invention, the base layer is formed of at least one selected from the group consisting of polyethylene terephthalate, polyethylene naphthalate, polycarbonate, polystyrene, polymethacrylate, polymethylmethacrylate, polyacrylate, polyimide, and polyamide. The base layer may further include light-diffusing particles to form an uneven structure. The base layer may have a thickness of 10~1000 μm, preferably, 15~400 μm in order to improve mechanical strength, thermal stability and flexibility and to prevent the loss of transmitted light.

As described above, the optical sheet separately including a base layer and a structure layer was described. However, in the present invention, the above-mentioned resin cured layer may be formed on one side or both sides of the optical sheet formed by extruding one kind of resin without separating the base layer and the structure layer.

In the description of the present invention, although the optical sheets having a specific shape and structure were chiefly described, the present invention can be variously modified and changed by those skilled in the art, and these modifications and changes belong to the scope of the present invention.

MODE FOR INVENTION

Hereinafter, the present invention will be described in more detail with reference to the following Examples. However, the scope of the present invention is not limited thereto.

Example 1

Based on 100 parts by weight of the total amount of a composition, 50 parts by weight of 9,9-bis[4-(2-acryloyloxyethoxy)phenyl]fluorene, 32 parts by weight of phenoxyethyl acrylate, 10 parts by weight of tris(2-hydroxyethyl)isocyanurate triacrylate, 2 parts by weight of 1,6-hexadiol acrylate, 2.5 parts by weight of 2,4,6-trimethylbenzoyldiphenylphosphine oxide, 2 parts by weight of 2,2'-hydroxy-5-t-octoxybenzotriazole, 1 part by weight of bis(1,2,2,6,6-pentamethyl-4-piperidyl)sebacate, and 0.5 parts by weight of silicon acrylate were mixed with each other, and then heated to 40° C. for about 1 hour to be completely melted, thereby completing a composition. Thereafter, the composition was applied on one side of a base layer made of polyethylene terephthalate (manufactured by KOLON Corp., thickness: 188 μm), and then the base layer coated with the composition was disposed on the frame of a prism-shape roller. Subsequently, an ultraviolet irradiation apparatus (manufactured by Fusion Corp., 600 Watt/inch$^2$) was mounted with a type-D bulb, and then ultraviolet (UV) light of 900 mJ/cm$^2$ was applied toward the base layer to from a linear triangular prism having an apex angle of 90°, a pitch of 50 μm and a height of 27 μm, thereby manufacturing an optical sheet.

Example 2

An optical sheet was manufactured in the same manner as in Example 1, except that a composition including 50.495 parts by weight of 9,9-bis[4-(2-acryloyloxyethoxy)phenyl]fluorene and 0.005 parts by weight of silicon acrylate was used.

Example 3

An optical sheet was manufactured in the same manner as in Example 1, except that a composition including 45 parts by weight of 9,9-bis[4-(2-acryloyloxyethoxy)phenyl]fluorene and 5.5 parts by weight of silicon acrylate was used.

Example 4

An optical sheet was manufactured in the same manner as in Example 1, except that a lenticular lens having a semicircular longitudinal section and having a pitch of 50 µm and a height of 27 µm was formed.

Example 5

An optical sheet was manufactured in the same manner as in Example 1, except that a linear prism having streamline peaks and having a pitch of 50 µm (the longest width of the streamline portion in the longitudinal section of the prism is 3 µm) and a height of 27 µm was formed.

Example 6

An optical sheet was manufactured in the same manner as in Example 1, except that a linear prism having a pentagonal longitudinal section and having an apex angle of 95°, a pitch of 50 µm and a height of 27 µm was formed.

Example 7

An optical sheet was manufactured in the same manner as in Example 1, except that a curved prism having a semicircular longitudinal section and having a pitch of 50 µm and a height of 27 µm was formed.

Example 8

A dotted optical sheet having a semispherical longitudinal section and having a pitch of 60 µm and a height of 30 µm was manufactured in the same manner as in Example 1.

Example 9

An optical sheet was manufactured using a composition including 50.5 parts by weight of 9,9-bis[4-(2-acryloyloxyethoxy)phenyl]fluorene, excluding silicon acrylate used in Example 1, and then a curable composition including 100 parts by weight of silicon acrylate and 1.5 parts by weight of diphenyl(2,4,6-trimethylbenzoyl)-phosphine oxide as a photoinitiator was applied on the front surface of the optical sheet by a spraying method. Subsequently, an ultraviolet irradiation apparatus (manufactured by Fusion Corp., 600 Watt/inch$^2$) was mounted with a type-D bulb, and then ultraviolet (UV) light of 300 mJ/cm$^2$ was applied toward a base layer of the optical sheet.

Example 10

An optical sheet was manufactured using a composition including 50.5 parts by weight of 9,9-bis[4-(2-acryloyloxyethoxy)phenyl]fluorene, excluding silicon acrylate used in Example 1, and then a curable composition including 100 parts by weight of silicon acrylate and 1.5 parts by weight of diphenyl(2,4,6-trimethylbenzoyl)-phosphine oxide as a photoinitiator was applied on the front surface of the optical sheet and on a base layer by a spraying method. Subsequently, an ultraviolet irradiation apparatus (manufactured by Fusion Corp., 600 Watt/inch$^2$) was mounted with a type-D bulb, and then ultraviolet (UV) light of 900 mJ/cm$^2$ was applied toward the base layer of the optical sheet.

Comparative Example 1

An optical sheet was manufactured in the same manner as in Example 1, except that a composition including no silicon acrylate was used.

Comparative Example 2

An optical sheet was manufactured in the same manner as in Example 4, except that a composition including no silicon acrylate was used.

Comparative Example 3

An optical sheet was manufactured in the same manner as in Example 5, except that a composition including no silicon acrylate was used.

Comparative Example 4

An optical sheet was manufactured in the same manner as in Example 8, except that a composition including no silicon acrylate was used.

Scratch resistance, frictional force and brightness of the optical sheets in Examples 1 to 10 and Comparative Examples 1 to 4 were measured as follows.

(1) Scratch Resistance

When the optical sheets in Examples 1 to 10 and Comparative Examples 1 to 4 were compressed by a minimum of pressure using the standard weight of a Big Heart test apparatus manufactured by IMOTO Corp., whether or not their structure layers were scratched was measured, and the results thereof are given in Table 1 below. The degree of the damage of the structure layers was determined by the naked eye, and the criterion thereof is as follows.

Poor scratch resistance X<Δ<○<⊙ excellent scratch resistance (2) Frictional Force Frictional forces of the optical sheets in Examples 1 to 10 and Comparative Examples 1 to 4 were measured using SLED having a standard weight of 200 g by a frictional force test apparatus manufactured by Toyoseiki Corp., and the results thereof are given in Table 1 below.

(3) Brightness

The optical sheets in Examples 1 to 10 and Comparative Examples 1 to 4 were mounted on a backlight unit for 17-inch LCDs, and then luminescence at 13 points were measured and averaged, and the average values thereof were designated as brightness. The results thereof are given in Table 1 below.

TABLE 1

| Class. | Scratch resistance | Frictional force | Brightness |
| --- | --- | --- | --- |
| Example 1 | ○ | 5.0 N | 2456 |
| Example 2 | Δ | 6.5 N | 2450 |

TABLE 1-continued

| Class. | Scratch resistance | Frictional force | Brightness |
|---|---|---|---|
| Example 3 | ◉ | 4.0 N | 2395 |
| Example 4 | ◉ | 6.5 N | 2247 |
| Example 5 | ○ | 6.0 N | 2419 |
| Example 6 | ○ | 5.0 N | 2444 |
| Example 7 | ○ | 5.0 N | 2429 |
| Example 8 | ◉ | 6.0 N | 2237 |
| Example 9 | ○ | 5.0 N | 2450 |
| Example 10 | ○ | 5.0 N | 2451 |
| Comp. Example 1 | X | 7.0 N | 2455 |
| Comp. Example 2 | Δ | 7.5 N | 2239 |
| Comp. Example 3 | X | 7.0 N | 2419 |
| Comp. Example 4 | Δ | 7.0 N | 2281 |

As given in Table 1, it can be seen that the optical sheets of the present invention have a structure layer having excellent scratch resistance. Further, it can be seen that in addition to the changes of brightness and frictional force due to the difference in the shape of a structure layer, as the amount of silicon acrylate providing slippability is decreased, the scratch resistance of the optical sheet is deteriorated, and, as the amount of silicon acrylate is increased, the brightness of the optical sheet is deteriorated.

Thus, it can be seen that the optical sheet of the present invention includes a curable resin which does not decrease the brightness of the optical sheet without damaging structures at the time of being impacted by external shock and which provides slippability to the optical sheet, so that the frictional force resulting from the external shock is decreased, with the result that the optical sheet can flexibly cope with the external shock and cannot be easily damaged.

EXAMPLES OF SYNTHESIS OF URETHANE ACRYLATE OLIGOMER

Synthesis Example 1

0.195 mol of ether-based polyol (PPG, Lupranol 1100 manufactured by BASF Corp.), 0.243 mol of 1,6-hexanediol, and 0.03 g of dibutyltin dilaurate as a catalyst were introduced into a 1000 mL four-neck flask provided with an oil bath, a thermometer, a reflux condenser and a titration funnel, and were then stirred for 30 minutes at 70~80° C. to form a mixture. Subsequently, 0.730 mol of diphenylmethane diisocyanate was added to the mixture at 1-hour intervals two or three times, and was then reacted for about 5 hours to prepare a urethane prepolymer whose end is provided with isocyanate. In this case, the ratio of isocyanate group (N=C=O) to hydroxy group (OH) in the urethane prepolymer is 1.66, and the ratio of hard segment (HS) to soft segment (SS) in the urethane prepolymer is 1/1.32.

Subsequently, in order to prevent the thermal polymerization of vinyl groups, a reactor was cooled to a temperature of about 50° C., and then 0.657 mol of hydroxyethyl acrylate was added to the urethane prepolymer and then stirred for 4~6 hours until isocyanate groups were completely consumed. The fact that residual isocyanate does not exist according to the characteristic peak of N=C=O near a frequency of 2270 $cm^{-1}$ using Fourier transfer infrared spectroscopy (FT-IR) was confirmed, and then the reaction was terminated to obtain a urethane acrylate oligomer.

Synthesis Example 2

A urethane acrylate oligomer was prepared in the same manner as in Synthesis Example 1, except that a urethane prepolymer obtained by adjusting the ratio of polyol, a chain extender and diphenylmethane diisocyanate was used such that the ratio of hard segment (HS) to soft segment (SS) in the urethane prepolymer was 1/1.51.

Synthesis Example 3

A urethane acrylate oligomer was prepared in the same manner as in Synthesis Example 1, except that a urethane prepolymer obtained by adjusting the ratio of polyol, a chain extender and diphenylmethane diisocyanate was used such that the ratio of hard segment (HS) to soft segment (SS) in the urethane prepolymer was 1/2.65.

Synthesis Example 4

A urethane acrylate oligomer was prepared in the same manner as in Synthesis Example 1, except that a urethane prepolymer obtained by adjusting the ratio of polyol, a chain extender and diphenylmethane diisocyanate was used such that the ratio of hard segment (HS) to soft segment (SS) in the urethane prepolymer was 1/3.9.

Example 11

Based on 100 parts by weight of the total amount of the composition, 75 parts by weight of urethane acrylate prepared in Synthesis Example 1, 9 parts by weight of phenoxyethyl methacrylate (Sartomer, SR340), 10 parts by weight of phenoxyethyl acrylate (Sartomer, SR339), 1.5 parts by weight of 2,4,6-trimethylbenzoyldiphenylphosphine oxide as a photoinitiator, 1.5 parts by weight of methylbenzoyl formate as a photoinitiator, 2.5 part by weight of bis(1,2,2,6,6-pentamethyl-4-piperidyl)sebacate as an additive, and 0.5 parts by weight of silicon acrylate were mixed with each other at 60° C. for about 1 hour to form a composition. Thereafter, the composition was applied on one side of a base layer made of polyethylene terephthalate (manufactured by KOLON Corp., thickness: 188 μm), and then the base layer coated with the composition was disposed on the frame of a prism-shape roller. Subsequently, an ultraviolet irradiation apparatus (manufactured by Fusion Corp., 600 Watt/inch$^2$) was mounted with a type-D bulb, and then ultraviolet (UV) light of 900 mJ/cm$^2$ was applied toward the base layer to from a linear triangular prism having an apex angle of 90°, a pitch of 50 μm and a height of 27 μm, thereby manufacturing an optical sheet (D=215 μm).

Example 12

An optical sheet was manufactured in the same manner as in Example 11, except that a lenticular lens having a semicircular longitudinal section and having a pitch of 50 μm and a height of 27 μm was formed.

Example 13

An optical sheet was manufactured in the same manner as in Example 11, except that a linear prism having streamline peaks and having a pitch of 50 μm (the longest width of the streamline portion in the longitudinal section of the prism is 3 μm) and a height of 27 μm was formed.

Example 14

An optical sheet was manufactured in the same manner as in Example 11, except that a linear prism having a pentagonal longitudinal section and having an apex angle of 95°, a pitch of 50 μm and a height of 27 μm was formed.

Example 15

An optical sheet was manufactured in the same manner as in Example 11, except that a curved prism having a semicircular longitudinal section and having a pitch of 50 μm and a height of 27 μm was formed.

Example 16

An optical sheet was manufactured in the same manner as in Example 11, except that urethane acrylate obtained in Synthesis Example 2 was used.

Example 17

An optical sheet was manufactured in the same manner as in Example 11, except that urethane acrylate obtained in Synthesis Example 3 was used.

Example 18

An optical sheet was manufactured in the same manner as in Example 11, except that urethane acrylate obtained in Synthesis Example 4 was used.

Example 19

An optical sheet (D=152 μm) was manufactured in the same manner as in Example 11, except that urethane acrylate obtained in Synthesis Example 1 was used, and a base layer made of polyethylene terephthalate (manufactured by KOLON Corp., thickness: 125 μm) was used.

Example 20

An optical sheet (D=277 μm) was manufactured in the same manner as in Example 11, except that urethane acrylate obtained in Synthesis Example 1 was used, and a base layer made of polyethylene terephthalate (manufactured by KOLON Corp., thickness: 250 μm) was used.

Comparative Example 5

A BEF prism film (manufactured by 3M Corp.) was used as an optical sheet.

Comparative Example 6

A Brtie-200 prism film (manufactured by Doosan Corp.) was used as an optical sheet.

Comparative Example 7

An LES-T2 prism film (manufactured by LG Corp.) was used as an optical sheet.

Comparative Example 8

An optical sheet was manufactured in the same manner as Example 11, except that a composition including no silicon acrylate was used.

$D_1$, elastic recovery rate, scratch resistance and adhesivity of the optical sheets in Examples 11 to 20 and Comparative Examples 5 to 8 were measured as follows.

(1) $D_1$ and Elastic Recovery Rate $D_1$ and elastic recovery rates of the optical sheets in Examples 11 to 20 and Comparative Examples 5 to 8 were measured using 'Load-Unload test' items of a micro hardness meter (DUH-W201S) manufactured by Shimidazu Corp. of Japan. The ridge-shaped pointed portion of the structure layer of the optical sheet was disposed at the central portion of a flat indenter having a diameter of 50 mm, and then the $D_1$ and elastic recovery rates of the optical sheets were repeatedly measured five times under the following measuring condition 1, and then average values thereof were calculated. The results thereof are given in Table 2 below.

[Measuring Condition 1]
a. applied maximum compression force: 1 $g_f$(=9.807 mN)
b. compression force applied per second: 0.2031 mN/sec
c. stop time at the maximum compression force: 5 sec (2) Scratch Resistance When the optical sheets of Examples 11 to 20 and Comparative Examples 5 to 8 were compressed by a minimum of pressure using the standard weight of a Big Heart test apparatus manufactured by IMOTO Corp., whether or not their structure layers were scratched was measured, and the results thereof are given in Table 2 below. The degree of the damage of the structure layers was determined by the naked eye, and the criterion thereof is as follows.

Poor scratch resistance X<Δ<○<◉ excellent scratch resistance (3) Adhesivity

Adhesivity of the optical sheets of Examples 11 to 20 and Comparative Examples 5 to 8 was checked. It was determined whether or not the optical sheets adhered to each other when 100 g of a weight was placed on the optical sheets for 5 seconds and then removed. The degree of adhesion between the optical sheets was determined by the naked eye, and the criterion thereof is as follows.

Poor adhesivity (optical sheets adhered to each other) X <Δ<○<◉ excellent adhesivity (optical sheets did not adhere to each other)

TABLE 2

| Class. | D (μm) | $D_1$ (μm) | Measuring condition 1 Elastic recovery rate (%) | Scratch resistance | Adhesivity |
|---|---|---|---|---|---|
| Exp. 11 | 215 | 13.970 | 87.8 | ◉ | ◉ |
| Exp. 12 | 215 | 14.669 | 88.4 | ◉ | ◉ |
| Exp. 13 | 215 | 15.004 | 88.7 | ◉ | ◉ |
| Exp. 14 | 215 | 14.990 | 88.7 | ◉ | ◉ |
| Exp. 15 | 215 | 15.171 | 88.8 | ◉ | ◉ |
| Exp. 16 | 215 | 15.507 | 89.0 | ◉ | ○ |
| Exp. 17 | 215 | 16.205 | 89.5 | ◉ | ○ |
| Exp. 18 | 215 | 17.183 | 90.1 | ◉ | ○ |
| Exp. 19 | 152 | 13.540 | 87.4 | ◉ | ○ |
| Exp. 20 | 277 | 13.840 | 87.7 | ◉ | ○ |
| Co. Exp. 5 | 215 | 2.862 | 75.9 | X | ○ |
| Co. Exp. 6 | 215 | 4.846 | 83.8 | Δ | Δ |
| Co. Exp. 7 | 220 | 4.392 | 73.7 | X | ○ |
| Co. Exp. 8 | 215 | 13.680 | 87.6 | ◉ | X |

As given in Table 2, it can be seen that the optical sheets having an elastic recovery rate of 85% or more according to the present invention have a structure layer having excellent scratch resistance.

Thus, it can be seen that the optical sheet of the present invention, when deeply compressed, returns to a state most closely approximating the original state without damaging structures at the time when an external shock is applied, so that the optical sheet can flexibly cope with the external shock and cannot be easily damaged.

Meanwhile, it can be seen that the optical sheets adhered to each other when silicon acrylate providing slippability were not used.

The invention claimed is:

1. A prism sheet suitable for use in a backlight unit assembly, said prism sheet comprising:
a base layer; and
a resin cured layer having at least one structured surface, said structured surface being provided with multiple structures,
wherein the resin comprises a molecular chain containing a slippable chemical element, and a UV curable composition comprising a urethane acrylate oligomer obtained from a urethane prepolymer, wherein the ratio of a hard segment to a soft segment in the urethane prepolymer is 1:1.32 to 1:3.9; and
wherein the prism sheet has an elastic recovery rate of 90% or more, which is represented by Mathematical Formula 1 below when the structured surface of the resin cured layer is pressed to a maximum compression force of 1 $g_f$ at a pressing speed of 0.2031 mN/sec using a flat indenter, and then the pressing of the structured surface thereof is stopped for 5 seconds with it compressed, and then released:

$$Elastic\, recovery\, rate = \frac{D1 - D2}{D1} \times 100 \qquad \text{Mathematical Formula 1}$$

wherein $D_1$ is a depth of the prism sheet compressed by external pressure, and $D_2$ is a difference between the height of the prism sheet to which external pressure is not applied and the height of the prism sheet which is recovered by removing the external pressure.

2. The prism sheet according to claim 1, wherein the structures have a polygonal, semicircular, semielliptical, or cylindrical shape.

3. The prism sheet according to claim 1, wherein $D_1$ satisfies Mathematical Formula 2 below:

$$D1 > \frac{D}{25} \qquad \text{Mathematical Formula 2}$$

wherein D is a height of the optical sheet to which external pressure is not applied.

4. The prism sheet according to claim 1, wherein $D_1$ satisfies Mathematical Formula 3 below:

$$D1 > \frac{D}{19} \qquad \text{Mathematical Formula 3}$$

wherein D is a height of the optical sheet to which external pressure is not applied.

5. The prism sheet according to claim 1, wherein $D_1$ satisfies Mathematical Formula 4 below:

$$D1 > \frac{D}{14} \qquad \text{Mathematical Formula 4}$$

wherein D is a height of the optical sheet to which external pressure is not applied.

6. A prism sheet suitable for use in a backlight unit assembly, said prism sheet comprising:
a base layer;
a structured layer formed on the base layer, said structured layer containing at least one surface provided with structures; and
a resin cured layer formed on the structured layer and having a molecular chain containing a slippable chemical element,
wherein the resin comprises a UV curable composition comprising a urethane acrylate oligomer obtained from a urethane prepolyrner, wherein the ratio of a hard segment to a soft segment in the urethane prepolymer is 1:1.32 to 1:3.9; and
wherein the prism sheet has an elastic recovery rate of 90% or more, which is represented by Mathematical Formula 1 below when the structured surface of the resin cured layer is pressed to a maximum compression force of 1 $g_f$ at a pressing speed of 0.2031 mN/sec using a flat indenter, and then the pressing of the structured surface thereof is stopped for 5 seconds with it compressed, and then released:

$$Elastic\, recovery\, rate = \frac{D1 - D2}{D1} \times 100 \qquad \text{Mathematical Formula 1}$$

wherein $D_1$ is a depth of the prism sheet compressed by external pressure, and $D_2$ is a difference between the height of the prism sheet to which external pressure is not applied and the height of the prism sheet which is recovered by removing the external pressure.

7. The prism sheet according to claim 1, wherein the slippable chemical element is F or Si.

8. The prism sheet according to claim 1, wherein the resin cured layer is formed of a curable resin including F or Si.

9. The prism sheet according to claim 8, wherein the curable resin includes one or more selected from organic silicon compounds and fluorine-based acrylates.

* * * * *